(12) United States Patent
Vasey

(10) Patent No.: US 8,788,929 B2
(45) Date of Patent: Jul. 22, 2014

(54) SCRIPT GENERATION

(75) Inventor: Philip Edgar Vasey, Histon (GB)

(73) Assignee: Business Integrity Limited, London (GB)

( * ) Notice: Subject to any disclaimer, the term of this patent is extended or adjusted under 35 U.S.C. 154(b) by 1335 days.

(21) Appl. No.: 10/598,654

(22) PCT Filed: Mar. 4, 2005

(86) PCT No.: PCT/GB2005/000833
§ 371 (c)(1),
(2), (4) Date: Mar. 21, 2007

(87) PCT Pub. No.: WO2005/088445
PCT Pub. Date: Sep. 22, 2005

(65) Prior Publication Data
US 2007/0266328 A1 Nov. 15, 2007

Related U.S. Application Data

(60) Provisional application No. 60/551,988, filed on Mar. 10, 2004.

(30) Foreign Application Priority Data

May 5, 2004 (GB) .................................. 0410035.0

(51) Int. Cl.
*G06F 3/00* (2006.01)

(52) U.S. Cl.
USPC .......................................... 715/221; 715/224

(58) Field of Classification Search
USPC ........................... 715/234, 243, 254, 221, 224
See application file for complete search history.

(56) References Cited

U.S. PATENT DOCUMENTS

| | | | |
|---|---|---|---|
| 5,745,712 | A | 4/1998 | Turpin |
| 6,314,415 | B1 | 11/2001 | Mukherjee |
| 6,684,188 | B1 | 1/2004 | Mitchell |
| 2003/0018481 | A1 | 1/2003 | Zhou |
| 2003/0074636 | A1 | 4/2003 | Manepalli |
| 2003/0188260 | A1 | 10/2003 | Jensen |

FOREIGN PATENT DOCUMENTS

| | | |
|---|---|---|
| EP | 1100013 A | 5/2001 |
| WO | WO01/04772 A | 1/2001 |
| WO | WO03/061474 A | 7/2003 |
| WO | WO03/105022 A2 | 12/2003 |
| WO | WO2004/001628 A | 12/2003 |

OTHER PUBLICATIONS

International Search Report PCT/GB2005/000833.
GB Search Report GB0110035.0, Aug. 27, 2004, Business Integrity.
Honkala, XForms in X-Smiles, Web Information Systems Engineering, 2001, Proceedings of the Second International Conference on, Pscataway, NJ US, IEEE vol. 1, Dec. 3, 2001 pp. 203-211.
Abrams, M. "UIML: An Appliance-independent XML User Interface Language" Computer Networks, Elsevier Science Publishers, BV Amsterdam, NL vol. 31, No. 11-16, May 17, 1999.

*Primary Examiner* — Kyle Stork
(74) *Attorney, Agent, or Firm* — Anderson Gorecki & Rouille LLP

(57) ABSTRACT

Indirect update functions, for updating a form, are generated by supplying update functions to a synthesizer, and generating an activation network, based on these update functions. The invocation sequence of the activation network is then determined, and used to update elements of a form. The generation of the invocation sequence by the synthesizer removes the need for complex hand encoding of form structures, and provides a means by which the functions may be generated as part of a server, client or middleware application.

29 Claims, 15 Drawing Sheets

| Is the buyer | ○ | a registered company? |
| | ○ | a registered charity? |
| | ● | a private individual? |

Enter the business address:
Enter the company's number:
Enter the charity's number:
Enter private address:

Does the buyer have a guarantor: ○ yes
● no

Enter guarantor's name:

Figure 1a

| | | |
|---|---|---|
| Is the buyer | ○ | a registered company? |
| | ○ | a registered charity? |
| | ● | a private individual? |

Enter the business address: [          ]
Enter the company number: [          ]
Enter the charity number: [          ]
Enter private address: [          ]

Does the buyer have a guarantor: ● yes
　　　　　　　　　　　　　　　　○ no

Enter guarantor name: [          ]

| Is the buyer | ○ | a registered company? |
| | ● | a registered charity? |
| | ○ | a private individual? |

Enter the business address: [          ]

Enter the company number: [          ]

Enter the charity number: [          ]

Enter private address: [          ]

Does the buyer have a guarantor? ○ yes
○ no

Enter guarantor name: [          ]

Figure 1d

SCRIPT GENERATION

CROSS-REFERENCE TO RELATED APPLICATIONS

This is a National Stage Application of International Application No. PCT/GB2005/000833, filed Mar. 4, 2005, which claims the benefit of U.S. Provisional Application No. 60/551,988, filed Mar. 10, 2004, both of which are incorporated by reference.

FIELD OF THE INVENTION

This invention relates to the field of script generation for use in software applications. In particular, the invention relates to the generation of scripts used in on-line and desktop form and browser applications.

BACKGROUND TO THE INVENTION

Forms or dialogs have become an essential component in modern computers and software applications. Traditionally, such forms have been hand-encoded by a programmer. Such forms may be dynamic (automatically updated in response to answers input by a user) or static. Although the generation of the form description, and the layout of component elements is a relatively straightforward task, the generation of the code which controls the dynamic behaviour of the form can be far from straightforward. Even editing a static form, if the form is sufficiently complex, may be far from straightforward. The coding itself is then used to generate script subsequently interpreted by the viewing application, for example, Java™ or Javascript™ generation in a web browser.

When forms are hand-encoded, the interaction between elements may require much thought by the programmer. There may be subtle, yet significant consequences of selecting one option over another. The change may cause other elements to become available, or not, which in turn affects yet other elements. Thus, a simple change may have a ripple effect throughout the whole form.

A form viewed through a web browser may contain various elements which need information to be input or selected by a user. Depending on the information content generated by and required by the form, selection of various elements may enable and disable subsequent questions in earlier or latter parts of the form. (This situation is frequently encountered when using a document generation program.)

One example of a known automated document generation program is that described in WO01/04772. In this system, a server computer runs a document generation program and is capable of communicating with local or remote client computers over a local area network (LAN) or a wide area network (WAN), such as the Internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

When information is captured, the transaction values entered by the user will be substituted for the various variables in the standard document. One difficulty in capturing such transaction values using web pages or web forms, is ensuring that the page or form prompts the user for the correct information. This is a particular problem when, in a series of related questions, some of the information needed is dependent on an answer to a previous question. Omitting such dependencies when encoding the script from which the standard document is generated leads to the behaviour of the form being incorrect.

FIGS. 1a to 1d show simple examples of a form having question dependencies, where questions are enabled and disabled in response to answers provided by a user. The first question asked relates to whether a buyer is a private individual, a registered company or a charity. Depending on the answer provided to this question, the user is then prompted for a private address or a business address. In addition, if the buyer is a registered company or charity, the company or charity number is requested. If the buyer is a private individual, then the name of a guarantor may be requested.

The form illustrated in FIG. 1a has four possible states dependent upon the answer to the first question (status of buyer):

1a: private individual but no guarantor;
1b: private individual and a guarantor;
1c: registered company; and
1d: registered charity.

Hence, the question regarding private address will only be enabled if the user selects the status of the buyer as being a private individual. Similarly, the business address question will only be enabled if the user selects the status of the buyer as being a registered company or charity. Consequently, both of these questions are dependent on the status of the buyer. Both of these selections occur as a direct consequence of any change to the status of the buyer. In the following discussion, functions which update questions as a direct consequence of a change of state are referred to as direct functions. Any element which is directly affected by such a function is termed a direct element.

However, the status of the buyer can affect questions beyond such direct consequences. For example, in FIG. 1a, the buyer is selected as being a private individual, and a subsequent question asks whether the buyer has a guarantor. In this case the answer is no. However, in FIG. 1b, the option for the buyer to have a guarantor is selected as "yes", and hence the question requesting the name of the buyer's guarantor is enabled. In this situation therefore, the enabling of the buyer guarantor question is a direct consequence of the answer to the buyer status question, and the enabling of the guarantor name question is a direct consequence of the selection of whether the buyer has a guarantor or not. However, there are indirect consequences to the selection of the buyer's status.

If, subsequent to the selections made in FIG. 1b, the user discovers that, in fact, the status of the buyer is a registered company, the question regarding buyer guarantor name is no longer necessary. Therefore, if the status of the buyer is selected as "registered company", the questions regarding business address and company number must be enabled, and the buyer guarantor name question disabled. Both the business address and company number questions are a direct consequence of the change. However, the disabling of the guarantor name question is an indirect consequence of the change. Such an indirect consequence may be termed an indirect function. Although there is no single function to change the guarantor name when the private buyer option is selected, the combination of direct functions necessary to enable this change is effectively an indirect function. The order in which the direct functions are executed is termed an invocation sequence.

Using prior art methods, such a form must be hand encoded as a whole: it cannot be considered as a series of individual questions. The form is considered as a complex series of IF, THEN, ELSE statements, rather like a decision tree. In doing this, it is necessary to consider, for each question, the effect of all possible answers to that question on each subsequent question asked. This results in the coding of each question being interrelated to the coding of each other question: all of the direct and indirect consequences of changing the answer to a question must be considered.

Aside from being highly complex and time-consuming, if the form is subsequently edited to add or remove questions, the entire form must be re-encoded, as any additional coding for a question must be interrelated with the coding for all other questions. This is the case even if a question is added at the end of the form. The major drawback of using such complex code, other than the programmer time involved, is that complex code lines are prone to error and debugging such code is also time consuming and difficult.

It is extremely difficult to use this approach with forms that are automatically generated by various applications, including browser and web-based applications, due to the complexity and time-consuming nature of the encoding method. Even static forms must be completely re-entered if additional questions are added. Even if such a form is successfully encoded, a large amount of complex code must be exported to a form renderer, such as a web browser, in order to be viewed. This requires large computing resources and data transfer capabilities, making use of the form relatively slow and inefficient.

SUMMARY OF INVENTION

The present invention attempts to address the problems of the prior art by providing a method of generating invocation sequences of update functions to update elements of a form, the method comprising the steps of supplying update functions to a synthesiser, identifying trigger elements from the elements of the form in the update functions that trigger the invocation of the update function, generating an activation network based on the update functions at the synthesiser, and determining the invocation sequence of update functions for each trigger element.

The trigger elements may be determined by at least one of the value or status of the elements of the form.

The activation network may include cyclic update functions.

The update functions and the invocation sequence may be exported to a form renderer in a readable format. The update functions may be validation functions or activation functions.

The synthesiser may be stored on a server computer, or a client computer. The synthesiser may form part of a middleware application, located between a server computer and a client computer.

The synthesiser may be integrated with the form renderer, such as a web browser application.

The update functions may be supplied by one of a database engine and a form generator. The step of determining the invocation sequence may involve determining the order in which the update functions must be executed within the activation network.

The method of the present invention may additionally comprise the steps of: entering data to change the status of a first form element; determining the position of the first form element in the activation network; and triggering the update functions associated with the first form element to update the status of a second form element.

The present invention also provides a computer readable medium having program code stored thereon, which, when run on a computer, causes the computer to perform the steps of: supplying update functions to a synthesiser; identifying trigger elements from the elements of the form in the update functions that trigger the invocation of the update function; generating an activation network based on the update functions at the synthesiser; and determining the invocation sequence of update functions for each trigger element.

The present invention also provides a script generation system for generating an invocation sequence to update a form, the system comprising; a synthesiser for generating an activation network based on update functions supplied by a form generator and identifying trigger elements from the elements of the form in the update functions that trigger the invocation of the update function; and a determinator for determining the invocation sequence of the direct update functions, for each trigger element.

The trigger elements may be determined by at least one of the value or status of the elements of the form.

The activation network may include cyclic update functions.

The update functions and invocation may be exported to a form renderer in a readable format. The update functions may be validation functions or activation functions.

The synthesiser may be stored on a server computer or on a client computer. The synthesiser may form part of a middleware application, located between a server computer and a client computer.

The synthesiser may be integrated with the form renderer, such as a web browser application.

The update functions may be supplied by one of a database engine and a form generator.

The step of determining the invocation sequence may involve determining the order in which the functions must be executed within the activation network.

When the system of the present invention is in use, a user enters data to change the status of a first form element, the position in the activation network of the first form element is determined such that the update functions associated with the first form element are triggered so as to update the status of a second form element, in accordance with the invocation sequence.

It is envisaged that the synthesiser may be stored on a server computer, or may be stored on a client computer, or may form part of a middleware application, located between a server computer and a client computer. In addition, the synthesiser may be integrated with the form renderer. The form renderer may be a web browser application. The direct update functions may be supplied by a database engine or a form generator.

The determination of the invocation sequence may involve determining the order in which the direct functions must be executed within the activation network.

When the system is in use, a user enters data to change the status of a first form element, the position in the activation network of the first form element is determined such that the indirect update functions associated with the first form element are triggered so as to update the status of a second form element.

The generation of indirect update functions by the synthesiser removes the need for complex hand encoding of form structures, and provides a means by which the functions may be generated as part of a server, client or middleware application.

BRIEF DESCRIPTION OF THE DRAWINGS

The invention will now be described by way of example, and with reference to the following drawings in which;

FIGS. 1a, 1b, 1c and 1d, referred to above, illustrates a simple web form having question dependencies;

FIGS. 2a, 2b and 2c show highlighted elements in the activation network for the form of FIG. 1a;

DESCRIPTION OF PREFERRED EMBODIMENTS

Figure 1C:
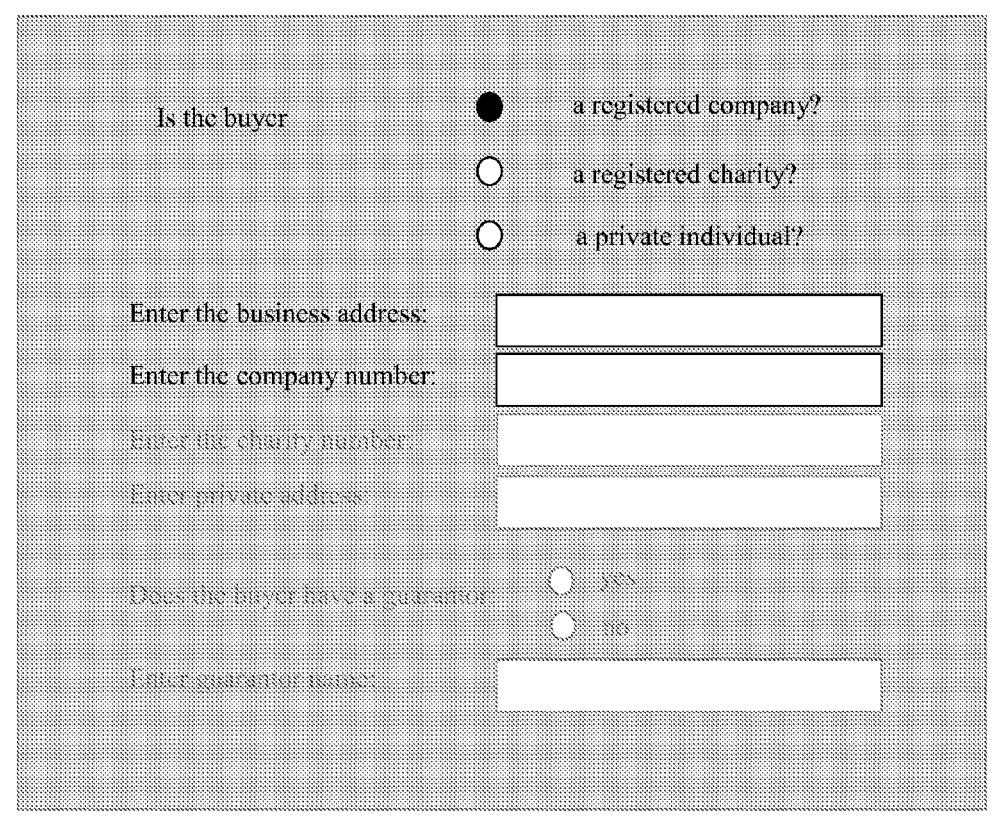
Figure 2A:
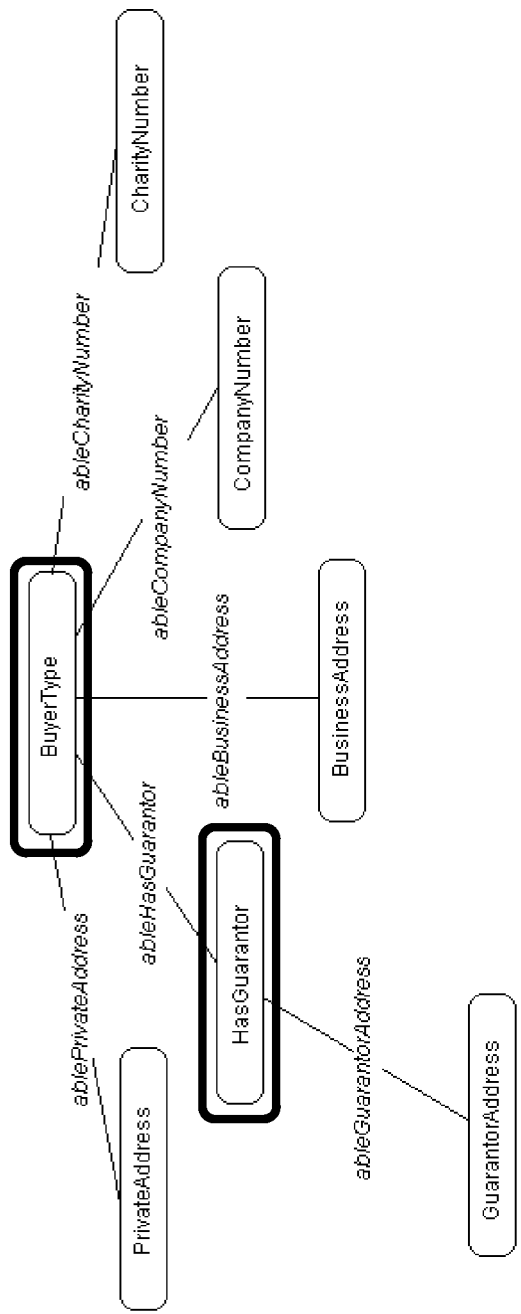

The script generation method embodying the present invention will now be described. As discussed above, the form in FIG. 1a illustrates a typical form that may be generated by a document generation program. The example chosen is that of providing details of a buyer in a purchase contract. Similar forms may be generated by other types of form generators, such as database engines, for example, Oracle 81™. These forms all have an element of dynamic behaviour in common, in that answering a question or providing a variable or value affects other questions appearing on the form.

Returning to FIGS. 1a, 1b, 1c and 1d described above, the form questions are known as elements, where an element accepts input from or by a user. When the user selects the buyer status (by inputting to the appropriate element), code must be generated to perform the function of enabling or disabling the relevant address question. The function that must be carried out is known as an on Change function. There are two types of on Change function:
validation function: alerts the user that the value of an element (or a combination of element values) is invalid;
update function; reacts to change the value of an element by updating other elements of the form.

Additionally, it is possible to define two types of element:
trigger element: any element occurring within a validation function or which causes a change to another element through an update function;
activated element: any element changed by an update function.

There are six update functions associated with the form in FIGS. 1a, 1b, 1c and 1d:

```
function    ableCompanyNumber
            if      BuyerType = "a registered company"
            then    enable element CompanyNumber
            else    disable element CompanyNumber
function    ableCharityNumber
            if      BuyerType = "a registered charity"
            then    enable element CharityNumber
            else    disable element CharityNumber
function    ableBusinessAddress
            if      BuyerType = "a registered company"
            or      BuyerType = "a registered charity"
            then    enable element BusinessAddress
            else    disable element BusinessAddress
function    ablePrivateAddress
            if      BuyerType = "a private individual"
            then    enable element PrivateAddress
            else    disable element PrivateAddress
function    ableHasGuarantor
            if      BuyerType = "a private individual"
            then    enable element HasGuarantor
            else    disable element HasGuarantor
function    ableGuarantorName
            if      HasGuarantor = "yes"
            then    enable element GuarantorName
            else    disable element GuarantorName
```

The form elements are: BuyerType, HasGuarantor, CompanyNumber, CharityNumber, BusinessAddress and PrivateAddress.

The form elements which occur in such update functions are classified as trigger elements, as discussed above, (those that cause an action to occur) and activated elements (those that are affected by an action).

In the functions above, for example, BuyerType and HasGuarantor are both trigger elements, and CompanyNumber, CharityNumber, BusinessAddress, PrivateAddress, HasGuarantor and GuarantorName are all activated elements. An element, such as HasGuarantor in the example above, can be both a trigger element of a first update function and an activated element of a second update function.

Figure 2B:
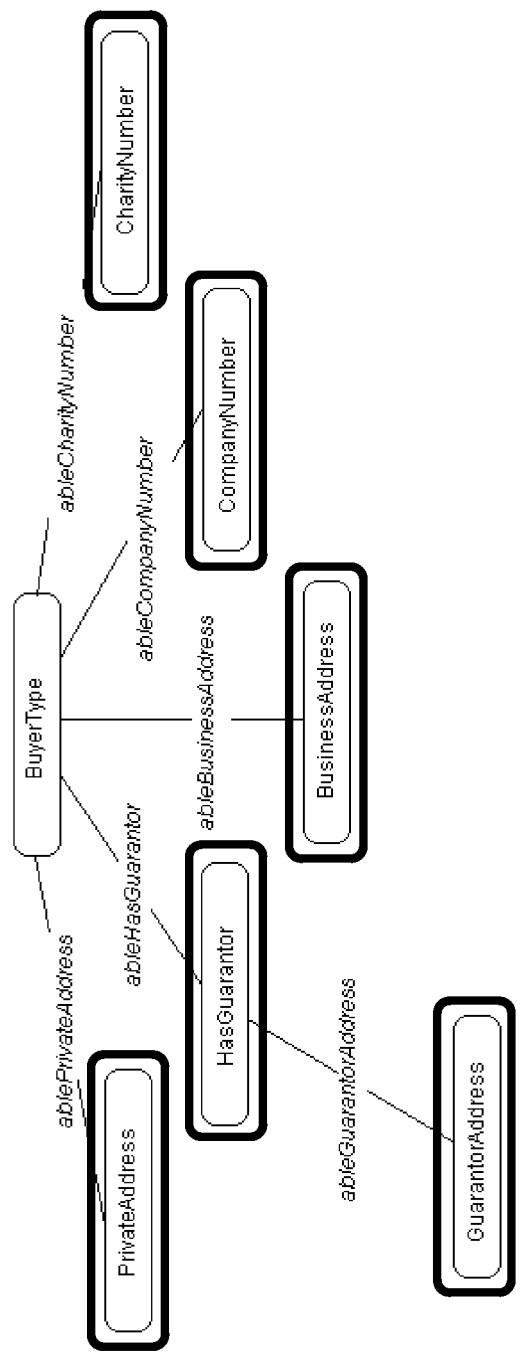
Figure 2C:
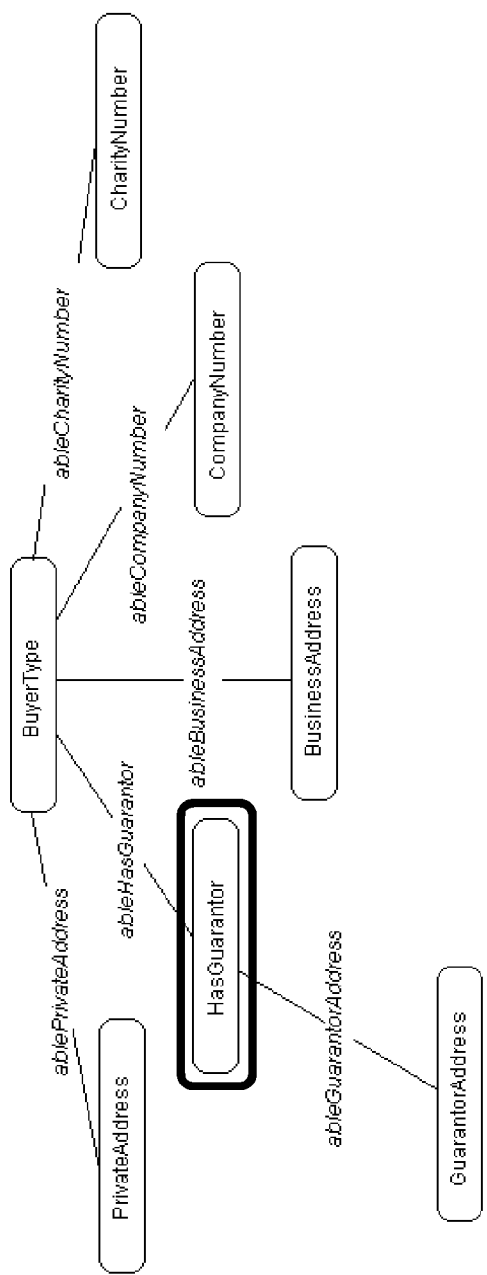

FIGS. 2a, 2b and 2c illustrate how the elements and functions described above interact. In FIG. 2a, the highlighted elements are trigger elements. In FIG. 2b, the highlighted elements are activated elements. In FIG. 2c, the highlighted element is both a trigger element and an activation element.

Each trigger element in the form requires an on Change function to be defined, which reacts to user input. The definition of an on Change function takes the general form:

function on ChangeTriggerElement
if (validation of the trigger element's value)
then (an invocation sequence of update functions)

Thus the invocation sequence of update functions must include, at the very least, all the update functions for which that element is a trigger element. Therefore, the invocation sequence for the element BuyerType above must include the update functions ableCompanyNumber, ableCharityNumber, ableBusinessAddress, ablePrivateAddress and ableHasGuarantor.

In addition, the elements that are activated by the update functions may themselves be trigger elements of other update functions, and these too must be included in the invocation sequence.

Thus, the invocation sequence for the trigger element BuyerType in the example above must also include the indirect update function ableGuarantorName whose trigger element HasGuarantor is activated by the direct update function ableHasGuarantor.

The problem to be addressed is in what sequence all the update functions are invoked for each different trigger element. In order to determine these invocation sequences an activation network is constructed from the form elements (the nodes on the network) and the update functions (the arrows connecting the nodes).

FIGS. 2a, 2b and 2c show the activation network for the form shown in FIGS. 1a, 1b, 1c and 1d. This network contains nodes for each of the elements BuyerType, CompanyNumber, CharityNumber, BusinessAddress, PrivateAddress, HasGuarantor and GuarantorName. The arrows on the network represent the update functions ableCompanyNumber, ableCharityNumber, ableBusinessAddress, ablePrivateAddress, ableHasGuarantor and ableGuarantorName. It is clear from this figure that, when the BuyerType element is changed by the user, the update function ableHasGuarantor must be invoked before the update function ableGuarantorName. However, in a more complicated activation network, the sequence in which update functions are invoked is fundamentally important to the correct dynamic behaviour of the form, and can be much more complex to derive.

Figure 3:
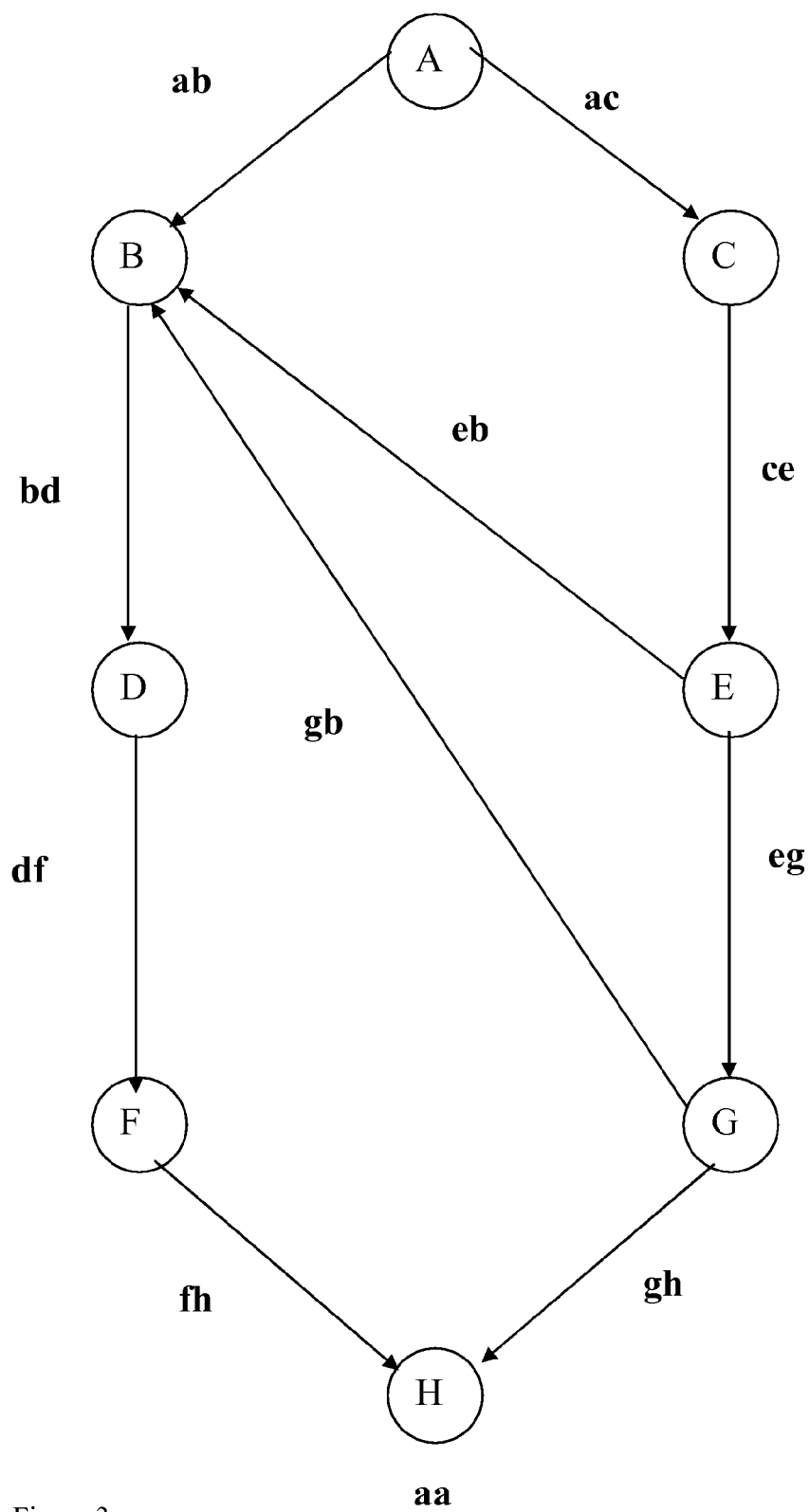
FIG. 3 is an illustration of an acyclic activation network.
Figure 4:
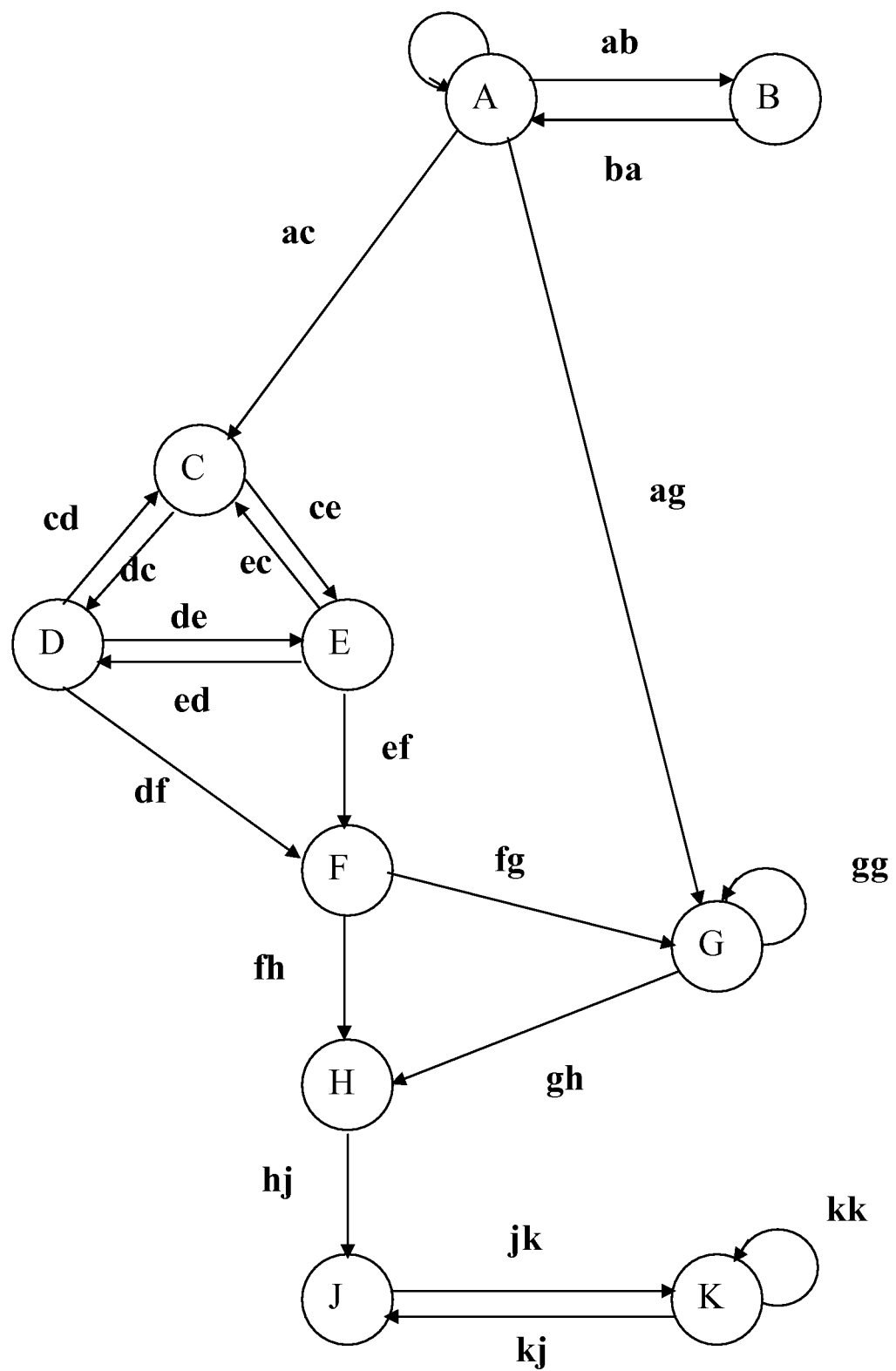
FIG. 4 is an illustration of a cyclic activation network.

In general, activation networks can be classified as cyclic (where some elements affect themselves either directly or indirectly) or non-cyclic. FIG. 3 illustrates a non-cyclic activation network and FIG. 4 illustrates a cyclic activation network. The nodes (labelled A, B, C and so on) on the activation network represent the form element. The arrows (labelled ab, ac and so on) represent the activation by a trigger element (the source of the arrow) of an activated element (the target of the arrow) through the invocation of some update function.

The sequence in which update functions are invoked (the invocation sequence) for each trigger element is determined by a breadth-first expansion of the activation network. In this expansion, any acyclic path of length N from a first node X to a second node Y is expanded into a path of length N+1 from the first node X to a third node Z by appending a path of length 1 from the second node Y to the third node Z. This will now be explained in more detail with reference to the activation networks shown in FIGS. 3 and 4.

FIG. 3 illustrates an acyclic activation network, comprising 8 trigger elements A to H. The update functions are represented by the arrows between the trigger elements, each labelled according to their origin and destination. For example, the update function for updating C with respect to A is labelled ac, that for updating B with respect to A labelled ab and so on. Consequently, changing form element A necessitates an update to B and to C. However, updating C results in the need to update E. Updating E results in the need to update both G and B, and updating G results in the need to update B again, and H.

The order in which each update is carried out is determined by the condition that all functions which lead to an update of an element are carried out before that element is subsequently used to update another: all functions corresponding to arrows entering a form element must be completed before the function corresponding to an arrow leaving the form element can be executed.

However, if more than one arrow enters a form element, it is immaterial in which order those updates occur. For example, consider form element B. This is updated by changes to A, E and G. G is determined by E, which in turn is dependent on A (via C). It makes no difference to the overall outcome of changes or updates to B if update eb is completed before updates eg and gb, or if updates eg and gb are completed before update eb.

In order to carry out the breadth-first expansion, the number of paths and the lengths of these paths between form elements are considered. In Table 1 below, the Function column represents the final update function in each path.

TABLE 1

| Length | From | Via | To | Function |
|---|---|---|---|---|
| 1 | A | | B | ab |
| 1 | A | | C | ac |
| 1 | B | | D | bd |
| 1 | C | | E | ce |
| 1 | D | | F | df |
| 1 | E | | B | eb |
| 1 | E | | G | eg |
| 1 | F | | H | fh |
| 1 | G | | B | gb |
| 1 | G | | H | gh |
| 2 | A | B | D | bd |
| 2 | A | C | E | ce |
| 2 | B | D | F | df |
| 2 | C | E | B | eb |
| 2 | C | E | G | eg |
| 2 | D | F | H | fh |
| 2 | E | B | D | bd |
| 2 | E | G | B | gb |
| 2 | E | G | H | gh |
| 2 | G | B | D | bd |
| 3 | A | B, D | F | df |
| 3 | A | C, E | B | eb |
| 3 | A | C, E | G | eg |
| 3 | B | D, F | H | fh |
| 3 | C | E, B | D | bd |
| 3 | C | E, G | B | gb |
| 3 | C | E, G | H | gh |
| 3 | E | B, D | F | df |
| 3 | E | G, B | D | bd |
| 3 | G | B, D | F | df |
| 4 | A | B, D, F | H | fh |
| 4 | A | C, E, B | D | bd |
| 4 | A | C, E, G | B | gb |
| 4 | A | C, E, G | H | gh |
| 4 | C | E, B, D | F | df |
| 4 | C | E, G, B | D | bd |
| 4 | E | B, D, F | H | fh |
| 4 | E | G, B, D | F | df |
| 4 | G | B, D, F | H | fh |
| 5 | A | C, E, B, D | F | df |
| 5 | A | C, E, G, B | D | bd |
| 5 | C | E, B, D, F | H | fh |
| 5 | C | E, G, B, D | F | df |
| 5 | E | G, B, D, F | H | fh |
| 6 | A | C, E, B, D, F | H | fh |
| 6 | A | C, E, G, B, D | F | df |
| 6 | C | E, G, B, D, F | H | fh |
| 7 | A | C, E, G, B, D, F | H | fh |

Once the number of paths and path lengths have been determined, the table is sorted, firstly with respect to the from column and then with respect to the length column. Duplicate entries in the Function column for each From node are removed. However, the last such entry is kept, as this represents the longest path. This is shown in Table 2 below.

TABLE 2

| Length | From | Via | To | Function |
|---|---|---|---|---|
| 1 | A | | B | ab |
| 1 | A | | C | ac |
| 2 | A | C | E | ce |
| 3 | A | C, E | B | eb |
| 3 | A | C, E | G | eg |
| 4 | A | C, E, G | B | gb |
| 4 | A | C, E, G | H | gh |
| 5 | A | C, E, G, B | D | bd |
| 6 | A | C, E, G, B, D | F | df |
| 7 | A | C, E, G, B, D, F | H | fh |
| 1 | B | | D | bd |
| 2 | B | D | F | df |
| 3 | B | D, F | H | fh |
| 1 | C | | E | ce |
| 2 | C | E | B | eb |

TABLE 2-continued

| Length | From | Via | To | Function |
|---|---|---|---|---|
| 2 | C | E | G | eg |
| 3 | C | E, G | B | gb |
| 3 | C | E, G | H | gh |
| 4 | C | E, G, B | D | bd |
| 5 | C | E, G, B, D | F | df |
| 6 | C | E, G, B, D, F | H | fh |
| 1 | D | | F | df |
| 2 | D | F | H | fh |
| 1 | E | | B | eb |
| 1 | E | | G | eg |
| 2 | E | G | B | gb |
| 2 | E | G | H | gh |
| 3 | E | G, B | D | bd |
| 4 | E | G, B, D | F | df |
| 5 | E | G, B, D, F | H | fh |
| 1 | F | | H | fh |
| 1 | G | | B | gb |
| 1 | G | | H | gh |
| 2 | G | B | D | bd |
| 3 | G | B, D | F | df |
| 4 | G | B, D, F | H | fh |

The resulting invocation sequences are taken from the Function column for each node in the From column, as shown in Table 3 below.

TABLE 3

| Trigger | Invocation Sequence |
|---|---|
| A | ab, ac, ce, eb, eg, gb, gh, bd, df, fh |
| B | bd, df, fh |
| C | ce, eb, eg, gb, gh, bd, df, fh |
| D | df, fh |
| E | eb, eg, gb, gh, bd, df, fh |
| F | fh |
| G | gb, gh, bd, df, fh |

Figure 5:
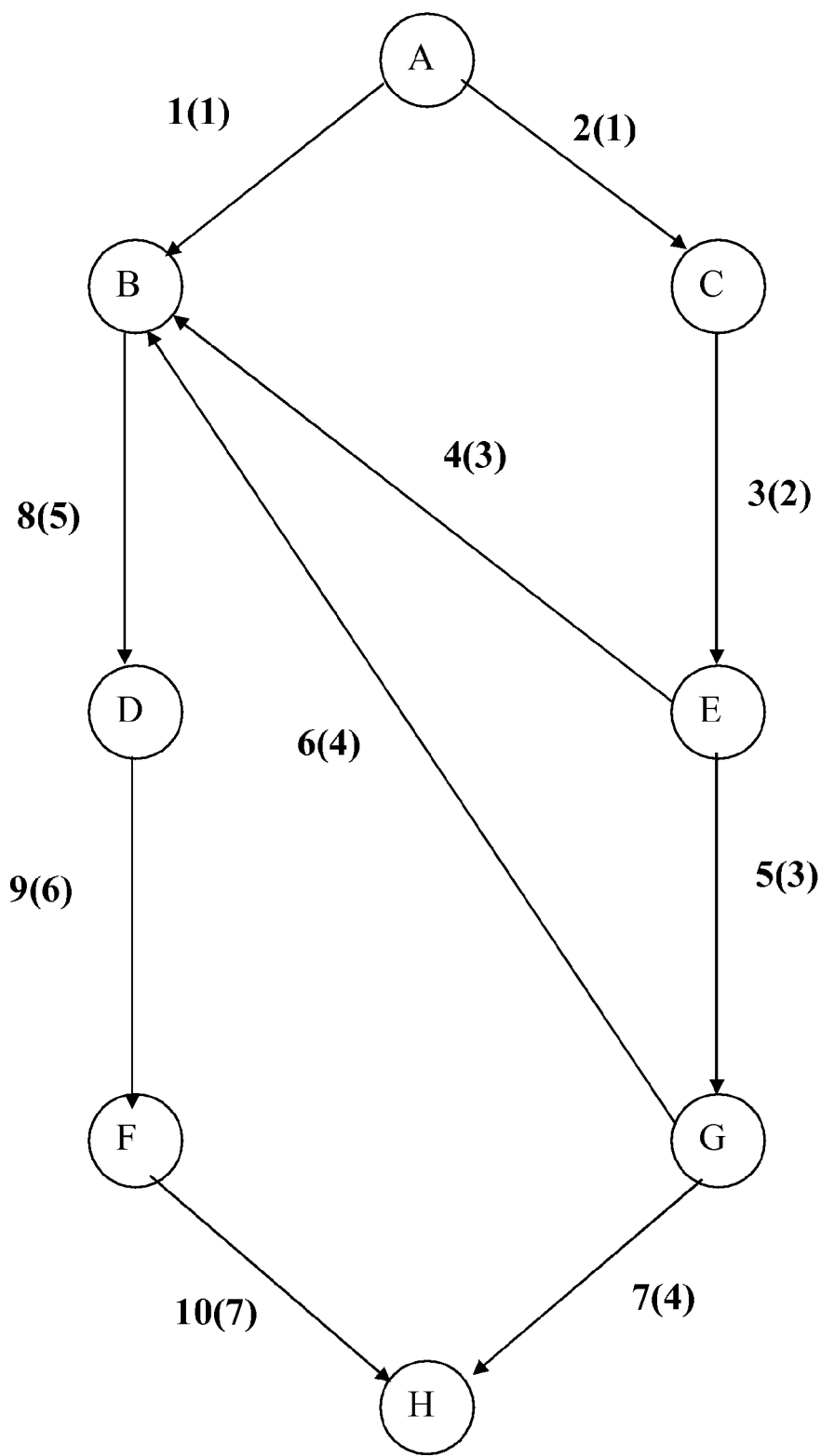
FIG. 5 shows the invocation sequence and also the path lengths for updating element A in FIG. 3.

An example invocation sequence for form element A is shown in FIG. 5. The numbered arrows represent the order in which each update function is executed, and the numbers in brackets represent the length of the longest path on which that particular activation occurs.

FIG. 4 illustrates a more complex cyclic activation network. In this activation network, a change to form element A causes updates to form elements B, C and G by the invocation of update functions ab, ac and ag, respectively. Furthermore, the update to form element B is reflected back to form element A by the invocation of the update function ba. Thus a change to form element A may cause itself to be updated.

The invocation sequences for this activation network, based on the breadth-first expansion, sorting and removing duplicates process described above, is shown in Table 4 below.

TABLE 4

| Trigger | Invocation Sequence |
|---|---|
| A | ab, ba, aa, ac, ag, cd, ce, de, ed, dc, ce, df, ef, fg, fh, gg, gh, hj, jk, kk, kj |
| B | ba, aa, ab, ac, ag, cd, ce, de, ed, dc, ce, df, ef, fg, fh, gg, gh, hj, jk, kk, kj |
| C | cd, ce, de, ed, dc, ce, df, ef, fg, fh, gg, gh, hj, jk, kk, kj |
| D | dc, de, df, ce, ec, cd, ed, ef, fg, fh, gg, gh, hj, jk kk, kj |
| E | ec, ed, ef, cd, dc, ce, de, df, fg, fh, gg, gh, hj, jk, kk, kj |

TABLE 4-continued

| Trigger | Invocation Sequence |
|---|---|
| F | fg, fh, gg, gh, hj, jk, kk, kj |
| G | gg, gh, hj, jk, kk, kj |
| H | hj, jk, kk, kj |
| J | jk, kk, kj |
| K | Kj, jk, kk |

Figure 6:
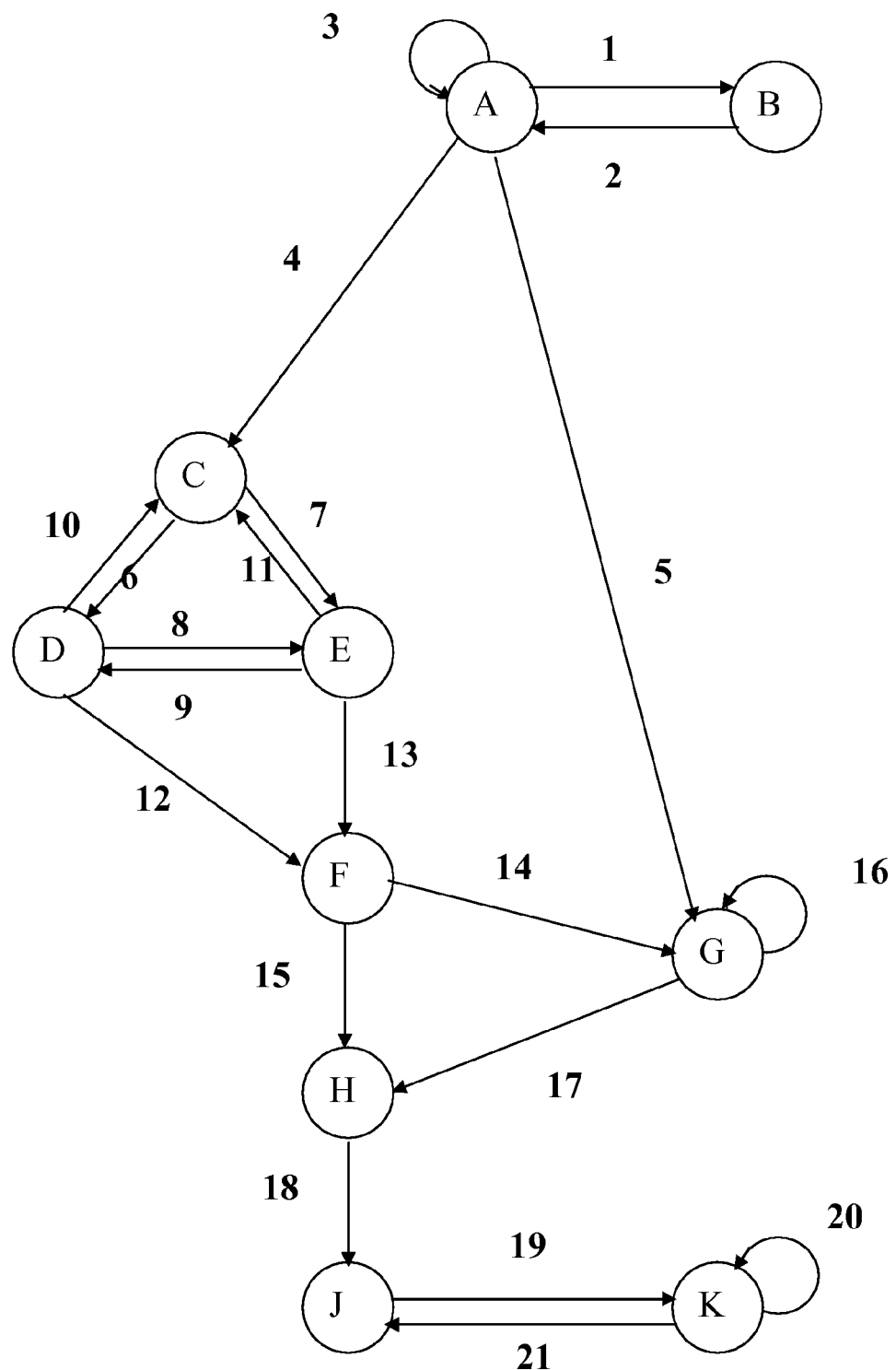
FIG. 6 shows the invocation sequence for updating element A in FIG. 4.

The invocation sequence for form element A is shown in FIG. 6, where the labels on the arrows represent the order in which that particular update function is executed.

The use of such activation networks and invocation sequences offers a great advantage over prior art methods of form encoding. The coding necessary to describe a form element is based on the functions necessary to create a change to or update of that form element, and the functions that must be executed once the form element is updated. Consequently, each form element needs only to be considered in relation to those form elements which either directly affect it, or are directly affected by it. This enables editing of the form in relation to one particular form element or adding or removing a form element without needing to re-encode the entire form.

For example, in FIG. 3, an additional form element I, dependent on F, and creating an update to H could be added. The addition of I has no effect on any other form element other than H, and the network must be updated to include an additional update function ih, which is called to update I. The additional application of the breadth-first expansion needed to take account of this addition can then be confined to considering the possible paths and path lengths from F to I and I to H. This results in an invocation sequence for I that does not affect that of A, B, C, D, E, or G. Hence, the encoding of the activation functions and sequences for these form elements is unaffected by the change.

It is therefore only necessary to know the direct update functions that are used to update one form element in response to a change in a form element directly related to it. These direct update functions are used to synthesise the OnChange function, as discussed above. It is the OnChange function, however, that allows the calculation of the indirect effects of a change to a form element, without the need to encode all direct and indirect changes by hand. The OnChange function is, in effect, the indirect function or functions necessary to update the entire form.

Consequently, the synthesis of the OnChange function allows a relatively simple map of relationships between form elements to be converted to an activation map or network (such as those shown in FIGS. 2a, 2b, 2c, 3 and 4), producing a series of executable functions and an order in which these must be executed, resulting in a method of producing dynamic functionality in a web-based form.

The synthesis of OnChange functions can occur at one of several points in the process of rendering a form for final use by a user. For clarity, the code generation engine which carries out the synthesis of the OnChange functions will be referred to as an OnChange synthesiser.

The function of the on Change synthesiser is to take the form description, validation functions (if any) and update functions generated by a form generator, convert these into a form description and OnChange functions, and export these in a script suitable for interpretation by a form renderer, such as a web browser.

Figure 7:
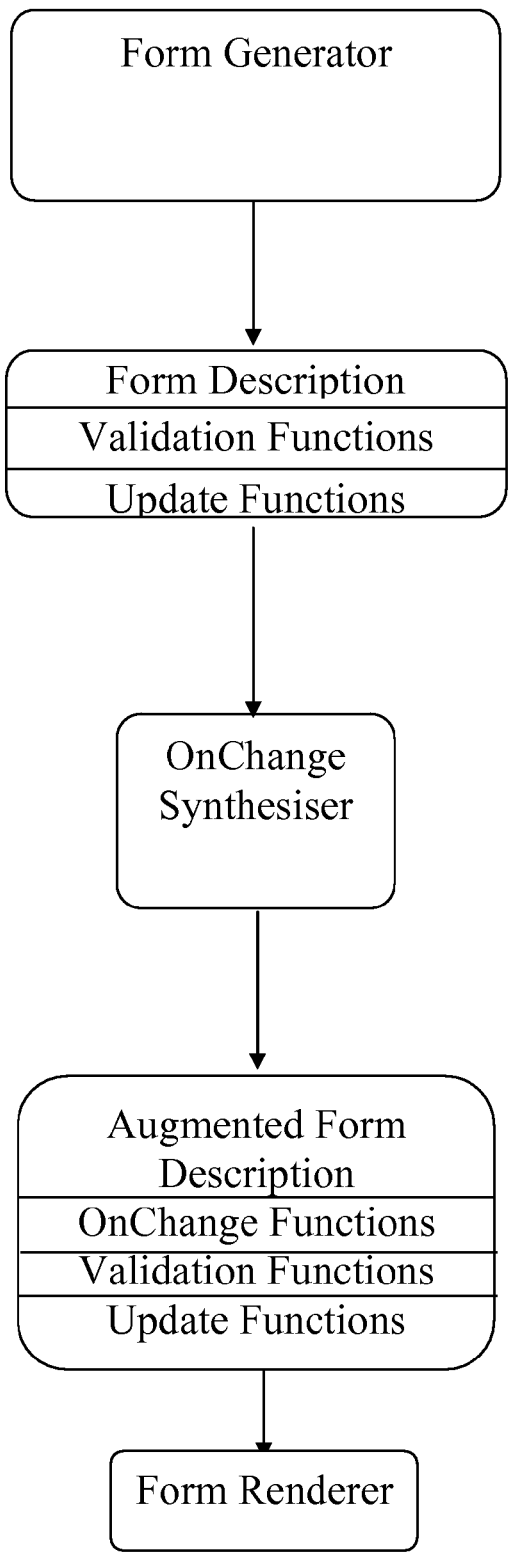
FIG. 7 illustrates the use of the on Change synthesiser embodying the present invention as middleware.

Firstly, the on Change synthesiser may be included as middleware between a form generator and a form renderer. This is illustrated in FIG. 7. A form generator, for example, a document generation program, Oracle 8i™, a database engine or other form generator is used to generate a form, containing a form description, validation functions and update functions. These are then passed to the on Change synthesiser, which generates the OnChange functions (including the invocation sequences discussed above). The data may be passed to the on Change synthesiser in any suitable script or language, for example, JavaScript™. This is then passed to the form renderer, which may be an application such as Netscape Navigator™, Microsoft™ Internet Explorer™ or Operating System Dialogs. The OnChange function and form description data (from the form generator) is exported to the form renderer in a script such as JavaScript™, or other language, such as Java™

The manner in which the OnChange functions are synthesised from a form generated by the form generator will now be described. In this example, the form has been generated by a document generation program, and relates to social services provisions.

The social services form requires the capture of four pieces of information:
the name of the applicant;
the gender of the applicant;
whether or not the applicant is pregnant; and
the number of months before the child is due.

For these four pieces of information, the following validation and update functions are needed:
validation functions:
the name of the applicant is compulsory;
the gender of the applicant is compulsory; and
the number of months before the child is due must be less than 9.
update functions:
when the "name" of the applicant changes so do the prompts for the other three questions;
when the applicant's "gender" changes, the "pregnancy" question is enabled or disabled; and
when the applicant's "pregnancy" changes the "when is the child due" question is enabled or disabled.

The validation functions therefore relate to verifying whether information input by a user is correct or present, and the update functions relate to information which must be updated, or questions that must be enabled in response to a user's answers.

The form contains the following elements:
the form itself:

```
<BODY>
<FORM NAME="ss_form">
the applicant's name:
<TR>
<TD>Enter the applicant's name:</TD>
<TD><INPUT TYPE="text" NAME="F1"></TD>
</TR>
``` the applicant's gender:

```
<TR>
<TD>Select<SPAN ID="N2">The Applicant</SPAN>'s gender:</TD>
<TD>INPUT TYPE="radio" NAME="F2" VALUE="male">Male
<BR><INPUT TYPE="radio" NAME="F2"
VALUE="female">Female</TD>
</TR>
``` is the applicant pregnant:

```
<TR>
<TD>Is <SPAN ID="N3">The Applicant</SPAN>pregnant:</TD>
<TD><INPUT TYPE="checkbox" NAME="F3"></TD<
</TR>
``` when is the child due:

```
<TR>
<TD>When is<SPAN ID="N4">The Applicant</SPAN>'s child's
expected birth
date:</TD>
<TD><INPUT TYPE="text" NAME="F4"></TD>
</TR>
</FORM>
</BODY>
```

The form also contains the following trigger elements (where the JavaScript™ functions are supplemented with declarations for the trigger elements):
The applicant's name is compulsory:

```
function validateF1( )
    {
        trigger document.ss_form.F1 ;
        if      (
                    document.ss_form.F1 ==""
                )
                {
                    alert ( "The applicant's name is compulsory") ;
                    document.ss_form.F1.focus( ) ;
                    return( false ) ;
                }
        else    {
                    return( true ) ;
                }
    }
```

The applicant's gender is compulsory:

```
function validateF2( )
    {
        trigger document.ss_form.F2 ;
        if      (
                    document.ss_form.F2[0].checked == false
                &&
                    document.ss_form.F2[1].checked == false
                )
                {
                    alert( "You must select a gender for the applicant") ;
                    document.ss_form.F2[0].focus( ) ;
                    return( false ) ;
                }
        else    {
                    return( true ) ;
                }
    {
```

When the child is due must be between 1 and 8 months:

```
function validateF4( )
    {
        trigger document.ss_form.F4 ;
        var     value = document.ss_form.F4.value ;
        var     IntegerValue = parseInteger(value) ;
        if      (
                    isaInteger( Value ) == false
                )
                {
```

```
                alert( "Enter a whole number" );
                document.ss_form.F4.focus( );
                return( false );
            }
        else if    (
                IntegerValue<1
                ||
                IntegerValue>8
                )
            {
                alert( "Enter a number between 1 and 8" );
                document.ss_form.F4.focus( );
                return( false );
            }
        else    {
                return( true );
            }
    }
```

The form also continues the following update functions (where the JavaScript™ functions are supplemented with declarations for both the trigger elements and the update elements):
The applicant's name as propagated to the prompts for the other three questions:

```
function propagateF1( )
    {
        trigger document.ss_form.F1 ;
        update N2.firstChild ;
        update N3.firstChild ;
        update N4.firstChild ;
        var Value = document.ss_form.F1.value ;
        var NonNullValue = ( Value =="""? "The Applicant" : Value ) ;
        N2.firstChild.nodeValue = NonNullValue ;
        N3.firstChild.nodeValue = NonNullValue ;
        N4.firstChild.nodeValue = NonNullValue ;
    }
```

The applicant's gender determines the enabling of the pregnancy questions:

```
function ableF3( )
    {
        trigger document.ss_form.F2 ;
        update document.ss_form.F3 ;
        if    (
                document.ss_form.F2[1] == true
                )
            {
                document.ss_form.F3.disabled = false
            }
        else    {
                document.ss_form.F3.disabled = true
            }
    }
```

The applicant's pregnancy determines the enabling of the months due question:

```
function ableF4( )
    {
        trigger document.ss_form.F3 ;
        update document.ss_form.F4 ;
        if    (
                document.ss_form.F3.checked == true
                )
            {
                document.ss_form.F4.disabled = false
            }
```

```
        else    {
                document.ss_form.F4.disabled =true
            }
    }
```

When the on Change synthesiser is configured as middleware between the form generator (in this case the document generation program) and the form renderer, the HTML and JavaScript™ code above is transformed into:

```
<BODY>
<FORM NAME="ss_form">
<TR>
<TD>Enter the applicant's name:</TD>
<TD><INPUT TYPE="text" NAME="F1"
onChange="onChangeF1( )"></TD>
</TR>
<TR>
<TD>Select <SPAN ID="N2">The Applicant</SPAN>'s gender:</TD>
<TD><INPUT TYPE="radio" NAME="F2" VALUE="male"
onClick="onChangeF2( )">Male
<BR><INPUT TYPE="radio" NAME="F2" VALUE="female"
onClick="onChangeF2( )">Female</TD>
</TR>
<TR>
<TD>Is<SPAN ID="N3">The Applicant</SPAN> Pregnant:</TD>
<TD><INPUT TYPE="checkbox" NAME="F3"
onClick="onChangeF3( )"></TD>
</TR>
<TR>
<TD>When is <SPAN ID="N4">The Applicant</SPAN>'s child's
expected birth
date:</TD>
<TD><INPUT TYPE="text" NAME+"F4"
onChange="onChangeF4( )"></TD>
</TR>
</FORM>
</BODY>
function onChangeF1( )
    {
        if    (
                validateF1( )
                )
            {
                propagateF1( ) ;
            }
    }
function onChangeF2( )
    {
        if    (
                validateF2( )
                )
            {
                ableF3( ) ;
                ableF4( ) ;
            }
    }
function onChangeF3( )
    {
        ableF4( ) ;
    }
```

The invocation sequence in the on Change function is the series of commands ableF3( ) ableF4( ).

This is then exported to the form renderer, allowing the form and its dynamic behaviour to be displayed. The on Change synthesiser therefore is able to analyse the HTML and JavaScript™ form created by either a form generator or a static form designed and hand encoded by a programmer to produce a series of OnChange functions, which are exported to the form renderer to enable the form to be displayed.

Figure 8:
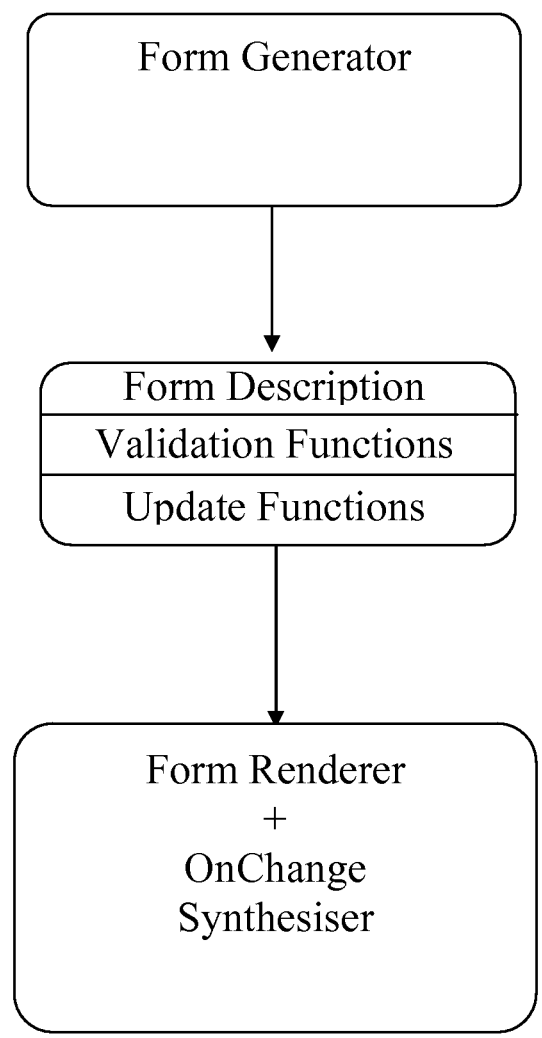
FIG. 8 illustrates the use of the on Change synthesiser embodying the present invention embedded in a form renderer.

Secondly, the on Change synthesiser may be used in client-side applications. For example, it may embedded within the form renderer, such as a web browser, or stored on the client computer as an application which is called when needed. This is illustrated in FIG. 8. Here, again the form renderer generates the form description, validation functions and update functions, all of which are now passed to the form renderer. The on Change synthesiser embedded in the form renderer uses the process described above to reproduce dynamic form behaviour in a script form which is interpretable by the browser. This is then used by the form renderer to display the form.

When the on Change synthesiser is embedded in a web browser, such as Microsoft™ Internet Explorer™, there are four actions to be completed between the HTML code arriving from a server and the form being rendered:
1 the JavaScript™ functions are inspected for trigger element and update element declarations;
2 the synthesiser is invoked producing an invocation sequence for each distinct trigger element;
3 new JavaScript™ functions are created (and appropriately named to distinguish them from any user-defined functions) for each trigger element that embodies its validation functions and invocation sequence; and
4 the new OnChange functions are associated with their corresponding trigger elements that are defined in the HTML code.

Figure 9:
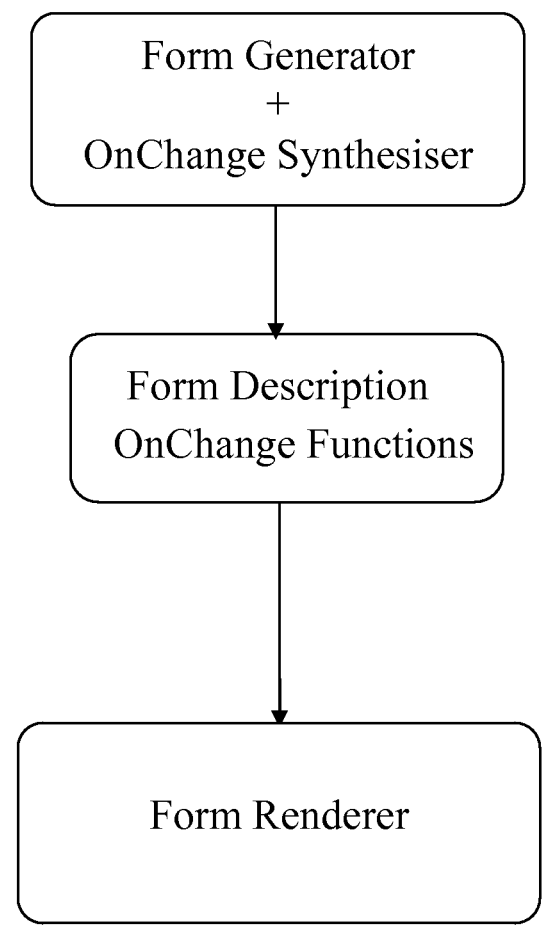
FIG. 9 illustrates the use of the on Change synthesiser embodying the present invention embedded in a form generator.
Figure 10:
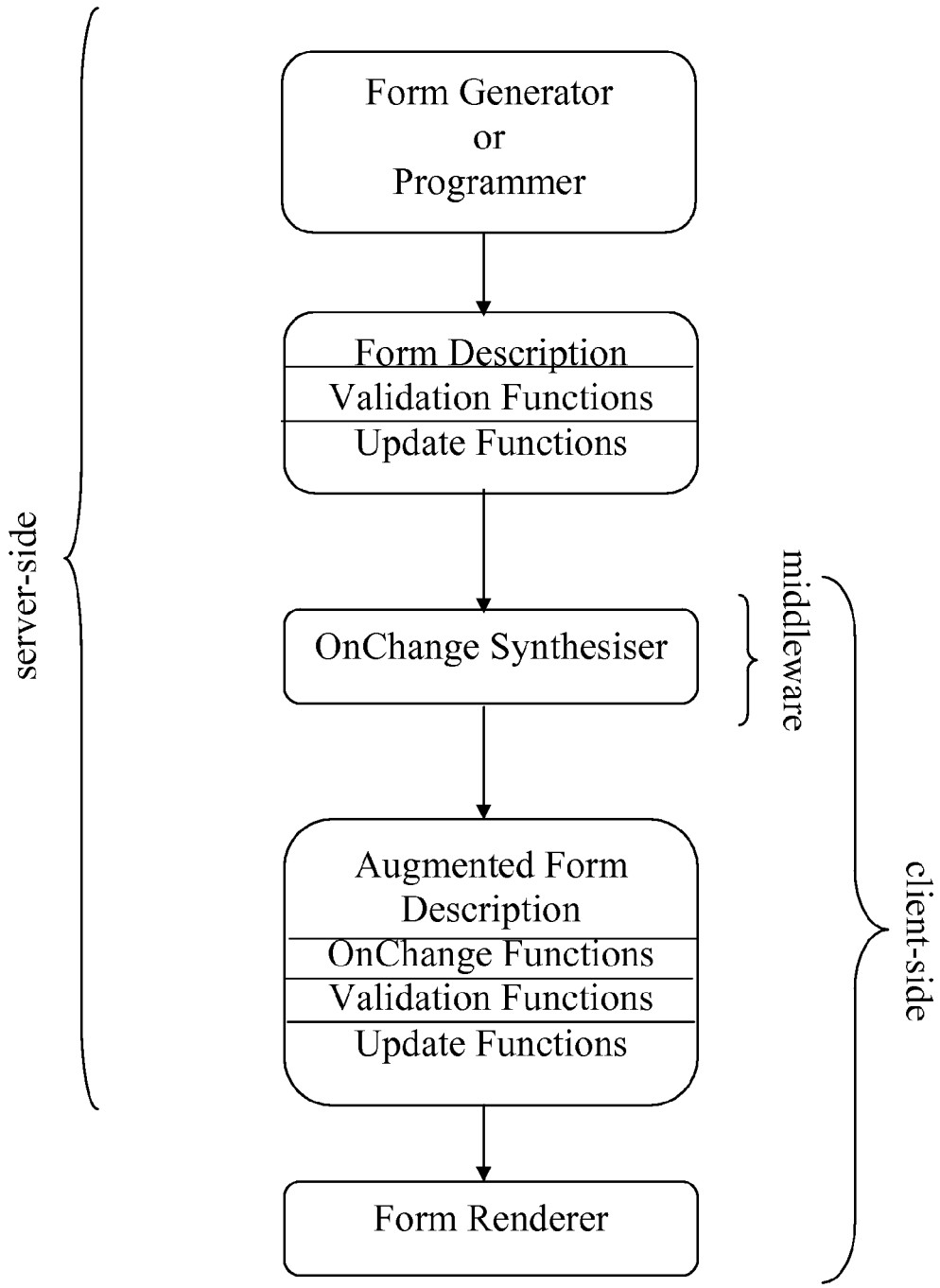
FIG. 10 illustrates how the on Change synthesiser is related to the server-side and client side applications.

Thirdly, as an alternative to embedding the on Change synthesiser in the web browser, which is a client side application, it may be included in a server application, for example, in the form generator, or as an additional application within the server itself. This case is illustrated in FIG. 9. Here the script produced by the on Change synthesiser is sent via the internet or Ethernet connection (such as TCP-IP or similar) directly to the form renderer on the client machine in the format necessary for the dynamic form to be displayed. The user then accesses the form stored on the server via the form renderer (which as above, may be a web browser). FIG. 10 illustrates how the applications of the synthesiser, client side and server-side systems are interrelated. Other combinations of client-, server-side and synthesiser applications than the three specific combinations referred to above may be envisaged, and are within the scope of the present invention.

Although the invention has been described with respect to dynamically generated forms, it may also be applied to statically generated forms, designed and encoded by a programmer.

Embodiments of the invention therefore remove the need to hand encode complex form structures or undertake complex editing, which leaves the program code open to error. Furthermore, the ability to edit a form structure without needing to re-encode the entire form reduces the programmer time necessary to construct and edit such forms, and allows dynamically generated forms, as well as static forms designed by a programmer to be edited and generated easily.

Various modifications to the invention, which are within the scope of the appended claims, will be clear to those skilled in the art.

The invention claimed is:

1. A method of generating an invocation sequence of update functions that update values associated with questions in a questionnaire form used to obtain information to produce a customized document from a template document, the invocation sequence specifying an order in which the update functions are invoked, the method comprising the steps of:
supplying the update functions to a synthesiser;
identifying, using the synthesizer, trigger questions from the questions of the questionnaire form that trigger invocation of at least one of the supplied update functions;
generating an activation network based on the identified update functions at the synthesiser; and
determining the invocation sequence of the identified update functions for each trigger question by using the activation network.

2. The method of claim 1, wherein the trigger elements are determined by at least one of the value or status of the elements of the form.

3. The method of claim 1, wherein the activation network includes cyclic update functions.

4. The method of claim 1, 2, or 3 further comprising the step of:
exporting the update functions and the invocation sequence to a form renderer in a readable format.

5. The method of claim 1, 2, or 3 wherein the update functions are validation functions.

6. The method of claim 1, 2, or 3 wherein the update functions are activation functions.

7. The method of claim 4, wherein the synthesiser is stored on a server computer.

8. The method of claim 4, wherein the synthesiser is stored on a client computer.

9. The method of claim 4, wherein the synthesiser forms part of a middleware application, located between a server computer and a client computer.

10. The method of claim 4, wherein the synthesiser is integrated with the form renderer.

11. The method of claim 10, wherein the form renderer is a web browser application.

12. The method of claim 1, 2 or 3 wherein the update functions are supplied by one of a database engine and a form generator.

13. The method of claim 1, 2 or 3 wherein the step of determining the invocation sequence involves determining the order in which the update functions must be executed within the activation network.

14. The method of claim 1, 2 or 3 further comprising the steps of:
entering data to change the status of a first form question;
determining the position of the first form question in the activation network; and
triggering the update functions associated with the first form question to update the status of a second form question.

15. A non-transitory computer readable medium having program code stored thereon, which, when run on a computer, causes the computer to generate invocation sequences of update functions to update values associated with questions in a questionnaire form used to obtain information to produce a customized document from a template document by performing the steps of:
supplying the update functions to a synthesiser;
identifying, with the synthesizer, trigger questions from the questions of the form that trigger the invocation of ones of the supplied update functions;
generating an activation network based on the update functions identified at the synthesiser; and
determining the invocation sequence of updated functions for each trigger question by using the activation network.

16. A non-transitory computer readable medium having program code stored thereon for generating an invocation sequence to update values associated with questions in a questionnaire form, comprising:
a synthesiser for generating an activation network based on update functions supplied by a form generator and identifying trigger questions from the questions of the form that trigger the invocation of ones of the update functions; and a determinator for determining the invocation sequence of the supplied update functions, for each trigger question, the form being updated based on the determined invocation sequence and output in tangible format.

17. The non-transitory computer readable medium of claim 16, wherein the trigger questions are determined by at least one of the value or status of the questions of the form.

18. The non-transitory computer readable medium of claim 16, wherein the activation network includes cyclic update functions.

19. The non-transitory computer readable medium of claim 16, 17, or 18 wherein the update functions and invocation sequence are exported to a form renderer in a readable format.

20. The non-transitory computer readable medium of claim 16, 17, or 18 wherein the update functions are validation functions.

21. The non-transitory computer readable medium of claim 16, 17, or 18 wherein the update functions are activation functions.

22. The non-transitory computer readable medium of claim 16, 17, or 18 wherein the synthesiser is stored on a server computer.

23. The non-transitory computer readable medium of claim 16, 17, or 18 wherein the synthesiser is stored on a client computer.

24. The non-transitory computer readable medium of claim 16, 17, or 18 wherein the synthesiser forms part of a middleware application, located between a server computer and a client computer.

25. The non-transitory computer readable medium of claim 16, 17, or 18 wherein the synthesiser is integrated with the form renderer.

26. The non-transitory computer readable medium of claim 25, wherein the form renderer is a web browser application.

27. The non-transitory computer readable medium of claim 16, 17, or 18 wherein the update functions are supplied by one of a database engine and a form generator.

28. The non-transitory computer readable medium of claim 16, 17, or 18 wherein the step of determining the invocation sequence involves determining the order in which the functions must be executed within the activation network.

29. The non-transitory computer readable medium of claim 16, 17, or 18 wherein, in use, a user enters data to change the status of a first form question, the position in the activation network of the first form question is determined such that the update functions associated with the first form question are triggered so as to update the status of a second form question, in accordance with the invocation sequence.

* * * * *